(12) United States Patent
Kulkarni et al.

(10) Patent No.: US 9,031,221 B2
(45) Date of Patent: May 12, 2015

(54) SYSTEM AND METHOD FOR AUTOMATED VOICE QUALITY TESTING

(71) Applicant: Cyara Solutions Pty Ltd, Melbourne, Victoria (AU)

(72) Inventors: Alok Kulkarni, Glen Iris (AU); Geoff Willshire, Greenslopes (AU)

(73) Assignee: Cyara Solutions Pty Ltd, Melboune (AU)

( * ) Notice: Subject to any disclaimer, the term of this patent is extended or adjusted under 35 U.S.C. 154(b) by 42 days.

(21) Appl. No.: 14/140,470

(22) Filed: Dec. 25, 2013

(65) Prior Publication Data

US 2014/0105379 A1    Apr. 17, 2014

Related U.S. Application Data

(63) Continuation of application No. 13/936,183, filed on Jul. 6, 2013, now abandoned, which is a continuation-in-part of application No. 12/644,343, filed on Dec. 22, 2009, now Pat. No. 8,625,772, application No. 14/140,470, which is a continuation-in-part of application No. 13/567,089, filed on Aug. 6, 2012, now abandoned.

(51) Int. Cl.
H04M 3/00 (2006.01)
H04M 1/64 (2006.01)
H04M 3/22 (2006.01)

(52) U.S. Cl.
CPC .................................. *H04M 3/2236* (2013.01)

(58) Field of Classification Search
USPC ...................................................... 379/265.02
See application file for complete search history.

(56) References Cited

U.S. PATENT DOCUMENTS

| 4,631,962 | A | * | 12/1986 | Genuit | 73/585 |
| 4,739,513 | A | * | 4/1988 | Kunugi et al. | 381/103 |
| 7,616,767 | B2 | | 11/2009 | Geiger et al. | |
| 8,175,286 | B2 | * | 5/2012 | Bech et al. | 381/71.4 |
| 8,731,221 | B2 | * | 5/2014 | Ura | 381/315 |
| 2008/0212788 | A1 | * | 9/2008 | Bech et al. | 381/59 |

* cited by examiner

*Primary Examiner* — Joseph T Phan

(74) *Attorney, Agent, or Firm* — Galvin Patent Law LLC; Brian R. Galvin

(57) ABSTRACT

A system for automated audio quality testing, having various endpoint emulators, call engines, audio generator devices, and head and torso simulator devices. The call engine utilizes reference audio samples to simulate customer interactions with a contact center. The endpoint manager utilizes reference audio samples to simulate contact center agents' interactions with customers.

2 Claims, 7 Drawing Sheets

SYSTEM AND METHOD FOR AUTOMATED VOICE QUALITY TESTING

CROSS-REFERENCE TO RELATED APPLICATIONS

This application is a continuation of U.S. patent application Ser. No. 13/936,183, titled "SYSTEM AND METHOD FOR AUTOMATED VOICE QUALITY TESTING", which was filed on Jul. 6, 2013, which is a continuation-in-part of U.S. patent application Ser. No. 12/644,343, titled "INTEGRATED TESTING PLATFORM FOR CONTACT CENTRES", which was filed on Dec. 22, 2009, and is a continuation-in-part of U.S. patent application Ser. No. 13/567,089, titled "SYSTEM AND METHOD FOR AUTOMATED ADAPTATION AND IMPROVEMENT OF SPEAKER AUTHENTICATION IN A VOICE BIOMETRIC SYSTEM ENVIRONMENT" which was filed on Aug. 6, 2012, the specifications of each of which are hereby incorporated by reference in their entirety.

BACKGROUND OF THE INVENTION

1. Field of the Invention

The invention relates to the field of contact center operations, and more particularly to the field of automated testing of voice quality for call-related applications.

2. Discussion of the State of the Art

In the field of contact center operations, traditionally communication between agents and customers is performed via voice-based systems such as traditional telephony or voice over Internet protocol (VoIP) systems. Such systems rely heavily on the quality of audio transmission between participants, as a breakdown in this audio would inhibit effective communication, which in the case of a contact center could have a negative impact on a variety of important metrics such as overall call length, or a customer's satisfaction with the service they received when calling. It is common in the art for a contact center to conduct research into customer satisfaction such as initiating outbound callbacks (wherein an agent proactively attempts to reach a customer who had previously called into a center to speak with an agent) to verify a customer's satisfaction. Using such research, it is possible for centers to receive feedback on the quality of their services both at an agent level (how helpful was the agent, how well did they listen, and other various metrics for agent performance), but also at a technology level (how accurately was the call routed to an agent appropriate for the issue, how clear was the connection, did the call drop or experience quality loss, or other such metrics). However, such methods are limited in that they require an agent to perform an outbound call to a customer, which has the negative effect of reducing the number of agents available to accept inbound calls, as well as potentially decreasing customer satisfaction by pursuing contact when it may not be desired or at an inopportune moment (such as a customer receiving a call when they are eating a meal).

What is needed is a means to test the quality of an audio connection in a contact center without necessitating either the input of a customer or the assistance of an actual agent, i.e. an automated and fully internal (with respect to a contact center's operations) system for audio quality testing.

SUMMARY OF THE INVENTION

Accordingly, the inventor has conceived and reduced to practice, in a preferred embodiment of the invention, a method for automated audio quality testing, and a preferred system for implementation of such a method.

According to a preferred embodiment of the invention, a system for automated testing and scoring of audio connection quality, comprising a plurality of endpoint emulators and call engines, is disclosed. According to the embodiment, system elements may be implemented alongside existing contact center architecture such as (for example) a web server which may operate a web interface or browser for call simulation creation, gateway such as a router or SIP server for directing calls or other data within a contact center, or a data network such as an Internet or other network. According to the embodiment, a web server may be connected to a call engine for the purpose of creating a call simulation, which may utilize existing audio samples (hereafter referred to as "reference audio") for testing purposes, a process which may be either manually or automatically operated. A call engine may then simulate a customer generating an inbound call request to a contact center, sending audio or other data over a public switched telephone network (PSTN) or via an Internet or other data network as may be appropriate for simulation of voice over Internet protocol (VoIP) call interactions. Within a contact center, an endpoint manager may be similarly connected to a web server for creation of a call simulation utilizing reference audio, to simulate an agent's participation in a customer interaction. An endpoint emulator may be similarly connected to existing components of a contact center's architecture, including (but not limited to) such elements as a router which may direct calls to their appropriate destinations (such as enforcing boundaries such that simulated interactions do not overlap with actual contact center activities, potentially having a negative impact on contact center performance or customer experience), a database or other storage medium which may store audio testing results or other data from simulations, or a call classifier which may inspect audio or other traffic passing through a contact center and determine whether such data is of an actual or simulated nature, again facilitating enforcement of boundaries so that simulations do not overlap with contact center operations. It will be appreciated by one having ordinary skill in the art, that such a system is by design flexible, and may be adapted to any of a variety of existing contact center architectures according to the invention, as such a system does not rely on specific contact center components other than those claimed.

In another preferred embodiment of the invention, a method for automated testing or scoring of audio quality is disclosed. According to the embodiment, a call simulation may be created within an endpoint emulator through a web interface, utilizing reference audio, for simulation of a contact center agent receiving an interaction from a customer. A similar call simulation with reference audio may be created within a call engine via a web interface, for simulation of a caller initiating a call with a contact center to interact with an agent. It will be appreciated that such call simulation creation processes may be either manual or automated processes, or some combination of both (such as manually creating a call simulation and then setting it to run at scheduled intervals) according to the invention. Reference audio for a caller simulation may then be sent from a call engine to a contact center environment via existing channels such as a PSTN or data network such as an Internet, as may be the case for VoIP call simulation. Within a contact center, a router or gateway may be implemented to distribute incoming calls appropriately and ensure that simulated calls from a call engine are sent to the appropriate endpoints, i.e. not sent to actual contact center agents who may be waiting to receive calls from actual customers. When an endpoint emulator receives incoming audio routed from a call engine, it may then measure the quality of the incoming audio and generate a score or rating accordingly, simulating the quality of audio as it would be perceived by a contact center agent receiving a call. This score may be stored in a database or other storage medium within a contact center for viewing and further action. An endpoint emulator may then respond with reference audio which is sent back to a call engine optionally via existing channels as described above, such as a router and PSTN or Internet or other network. When audio reaches a call engine, it may be similarly measured and scored for quality, appropriately simulating the quality of audio as it would be perceived by a customer during an interaction with a contact center agent. A call simulation may optionally continue in this manner, with reference audio samples being further sent between a call engine and endpoint emulator and measured or scored for respective quality, until such time as a call simulation is concluded either intentionally or due to an error or fault such as a dropped call (which may then be further logged in a database or other storage medium for testing and analysis purposes).

According to a further embodiment of the invention, a system for automated audio quality testing further comprising a plurality of audio generator devices, is disclosed. According to the embodiment, a plurality of audio generator devices may be implemented within a contact center as an element of an automated audio testing system, which may then be connected to agent equipment such as telephone handsets or headsets. During an audio testing simulation as described previously, when reference audio is to be sent from an endpoint emulator in response to received audio form a call engine, such reference audio may be played through an audio generator device into an agent's equipment such that in addition to testing the quality of audio over a contact center's architecture, testing is facilitated also of agent hardware (such as might facilitate determination of any audio quality loss due to a low-quality or defective agent headset). It will be appreciated that such an arrangement may be variable in nature, and if multiple audio generator devices are implemented they may be connected to a variety of agent hardware such as handsets, headsets, or other equipment in any combination. In this manner, such a system may be readily adapted to a variety of existing contact center architectures and agent hardware technology, and a system may be readily adapted as such architectures or technology may be subject to change (such as, for example, if a contact center upgrades agents' headset to a different model). It will be further appreciated that the implementation of audio generator devices need not require the use of actual agent workstations, and that agent hardware and audio generator devices may be connected in any arrangement to a contact center's architecture according to the embodiment, for example a contact center might dedicate a specific room to agent hardware testing, utilizing a variety of agent hardware attached to a server or similar computing hardware appropriate for simulating an agent workstation, such that an actual agent workstation environment may be unaffected by testing. In this manner, test equipment may be operated without interfering with contact center operations, and without diminishing the number of available physical agent workstations for use.

According to a further embodiment of the invention, a system for automated audio quality testing further comprising a plurality of head and torso simulator (HATS) devices, is disclosed. According to the embodiment, a HATS device may be a replica or "dummy" torso designed to simulate the physical arrangement and/or acoustic properties of a human body. Such a device may be utilized in conjunction with a system for automated audio quality testing as described previously, and may incorporate audio generator devices as described previously either integral to or removably fixed to a HATS device, for the purpose of generating and/or receiving audio in a manner closely resembling that of an actual agent. In such an arrangement, when reference audio is received by an endpoint emulator it may be transmitted through agent hardware such as a headset, and may then be received by an audio sensor integral to or removably affixed to a HATS device upon which such a headset may be placed. Audio quality may then be scored as described previously, and new reference audio may then be transmitted through an audio generator device integral to or removably affixed to a HATS device to simulate an agent speaking, which may then be received by agent hardware such as a handset or headset, for transmission back to a call engine as described previously. In this manner, audio testing may now incorporate testing of agent hardware according to actual use by a human agent, facilitating more thorough and precise testing of agent hardware and customer experience and more closely simulating actual contact center operations. It will be appreciated that such an arrangement need not require the use of physical agent workstations, and HATS devices may be utilized in any configuration alongside other elements to facilitate a flexible configuration that may be readily adapted to any contact center architecture, and adapted as such an architecture may be subject to change. In this manner, testing utilizing HATS devices may be performed without affecting contact center operations or reducing the number of physical agent workstation available.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

Figure 1:
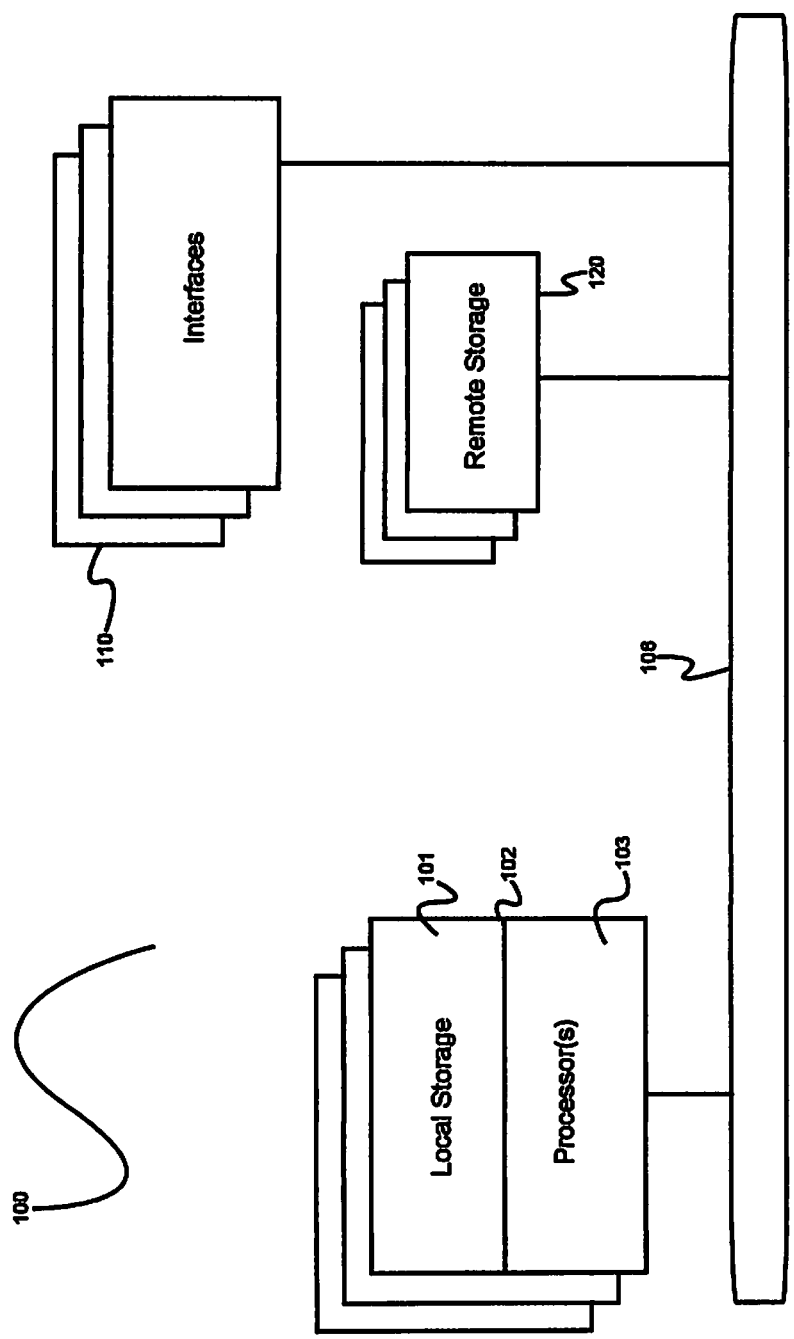
FIG. 1 is a block diagram illustrating an exemplary hardware architecture of a computing device used in an embodiment of the invention.

The inventor has conceived, and reduced to practice, a system and method for automation of audio-based contact center interaction quality testing, comprising a flexible architecture and adaptable method to facilitate wide use regardless of contact center architecture, and incorporating elements such as audio generator devices and HATS devices to further improve testing and optimize contact center operations.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

"Reference audio", as used herein, refers to prerecorded audio samples representing customer and contact center agent interaction elements, such as greetings, questions, or responses. Reference audio may be of various nature regarding such audio qualities as bitrate, length, or other audio qualities and it will be appreciated that the use of audio samples with varying qualities may benefit testing as actual interactions may not necessarily fall within "ideal" operating conditions.

A "head and torso simulator", abbreviated HATS, as used herein refers to a mechanical replica of a human torso designed as a stand-in for an actual human operator during testing, for such purposes as testing audio quality incorporating agent hardware such as telephony heandsets or headsets, or testing of audio transmission through a microphone. In this manner, every point of the customer-agent interaction process may be tested and scored according to the method of the invention, removing untested variables which may be detrimental to contact center operations.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some in stances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
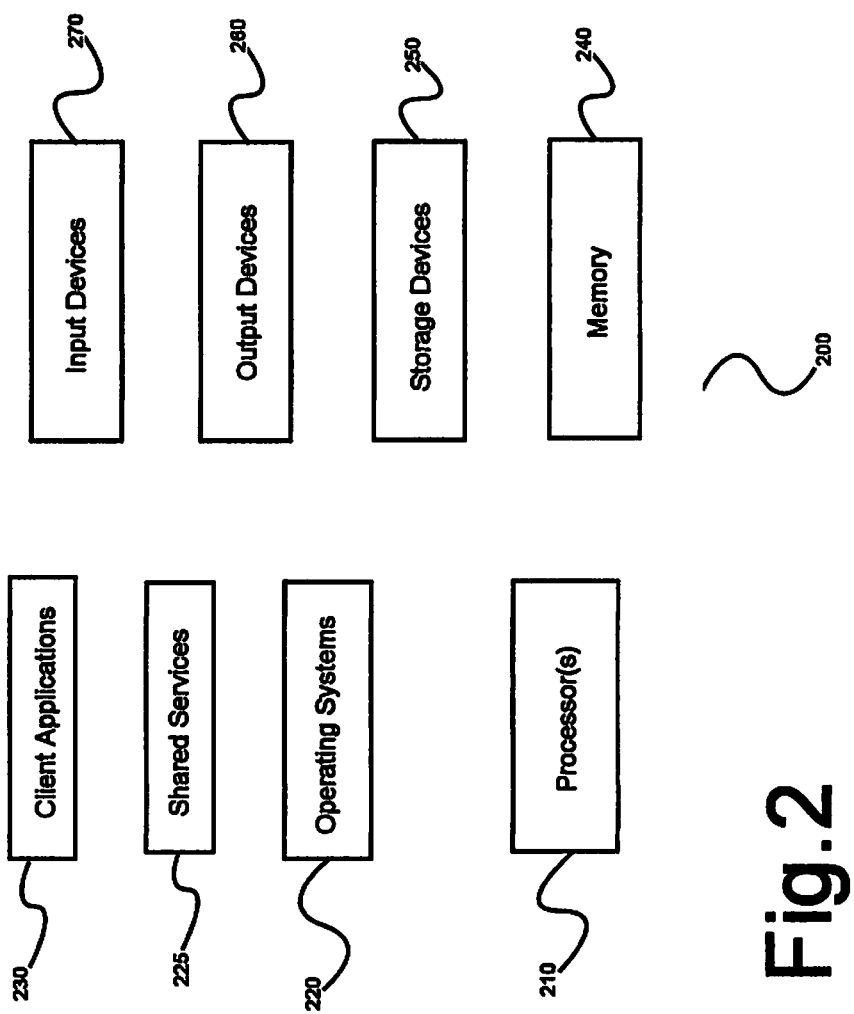
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200, and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
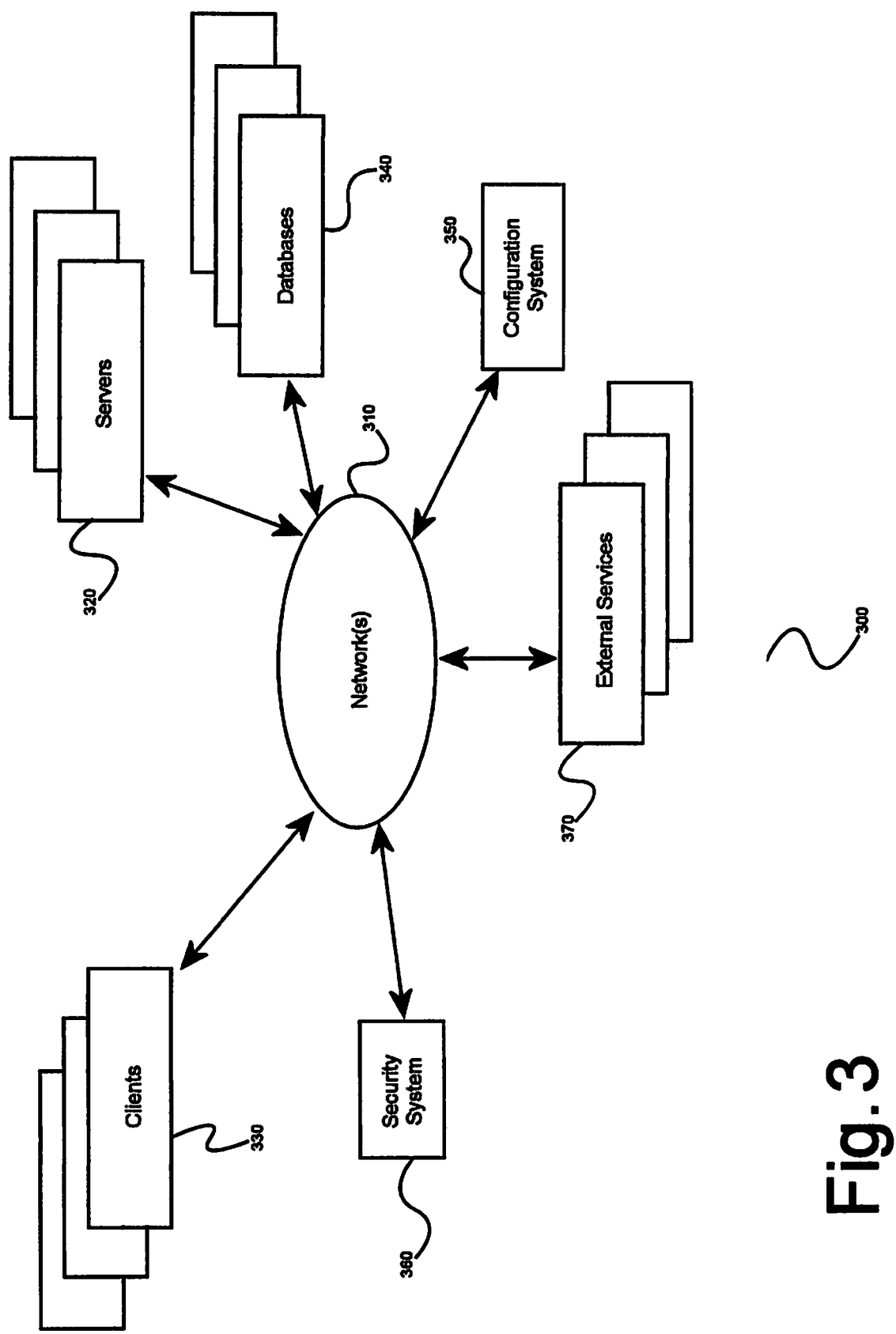
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 4:
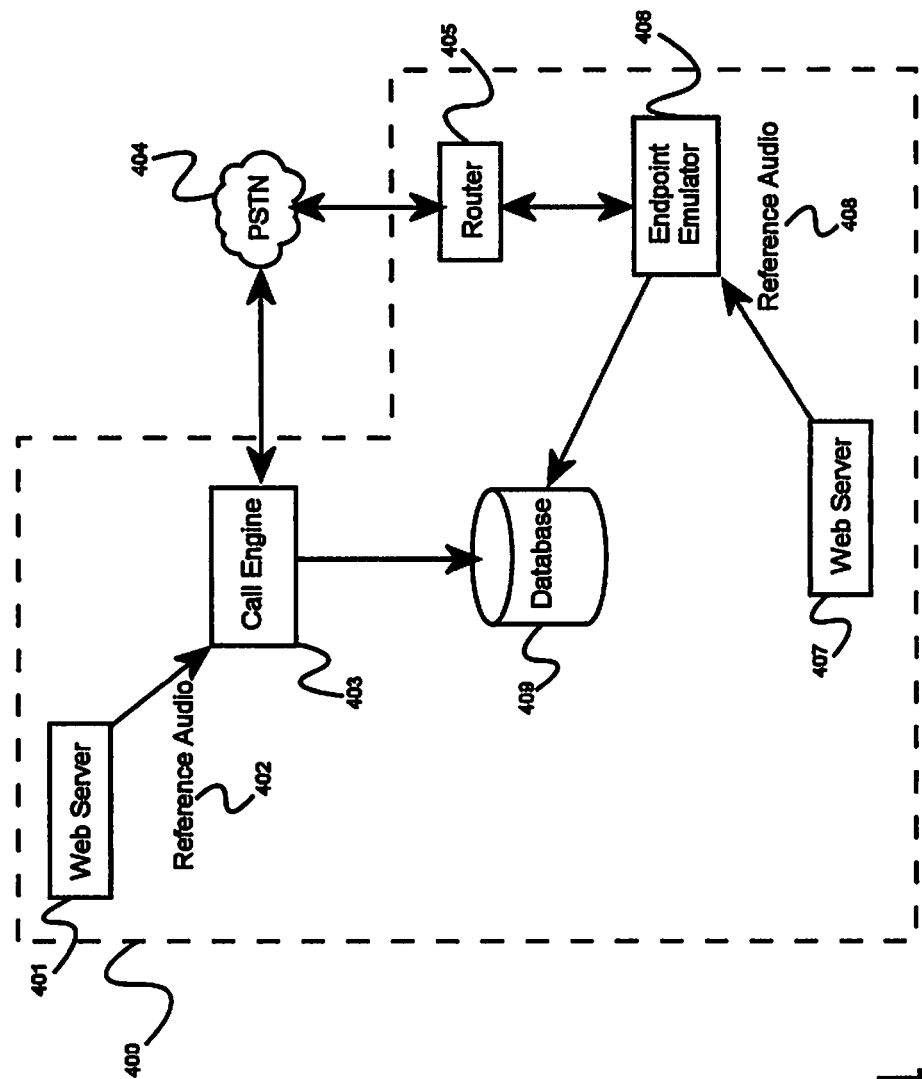
FIG. 4 is a block diagram illustrating an exemplary system for automated audio quality testing, according to a preferred embodiment of the invention.

FIG. 4 is a block diagram of a preferred embodiment of the invention, illustrating a system for automated audio quality testing within a contact center 400. As illustrated, a web server 401 may send reference audio 402, i.e. audio samples simulating a customer's interactions with a contact center agent, to a call engine 403. Similarly, a web server 407 may be used to send reference audio 408 representing audio samples of a contact center agent's participation in an interaction, to an endpoint emulator 406. Call engine 403 may then initiate a simulated call via a PSTN 404 or similar network (such as, in the case of VoIP calls, an Internet or similar data network), to which may be connected a router 405 within contact center 400. Router 405 may then determine to send a call simulation to an endpoint emulator 406, which may use previously received reference audio 408 to simulate a contact center agent's responses to a call. As illustrated, a bidirectional call flow may be established between call engine 403 and endpoint emulator 407, facilitating continued call simulation of a prolonged interaction as appropriate. Each time audio is received by a call engine 403 or endpoint emulator 407, it may be scored based on its quality and such a score optionally stored in a database 409 or similar data storage medium for later retrieval for review or analysis. In this manner, automated testing of audio quality across a contact center's systems may be facilitated, and such testing results stored for use in any of a variety of further applications, such as (for example) the generation of reports detailing test results or analysis of previous test results to facilitate optimization of future tests or contact center operations. It will be appreciated that the arrangement illustrated is exemplary, and that a variety of additional or alternate elements may be utilized according to the invention, enabling such a system to be flexible in nature and readily adaptable to a variety of contact center architectures.

Detailed Description of Exemplary Embodiments

Figure 5:
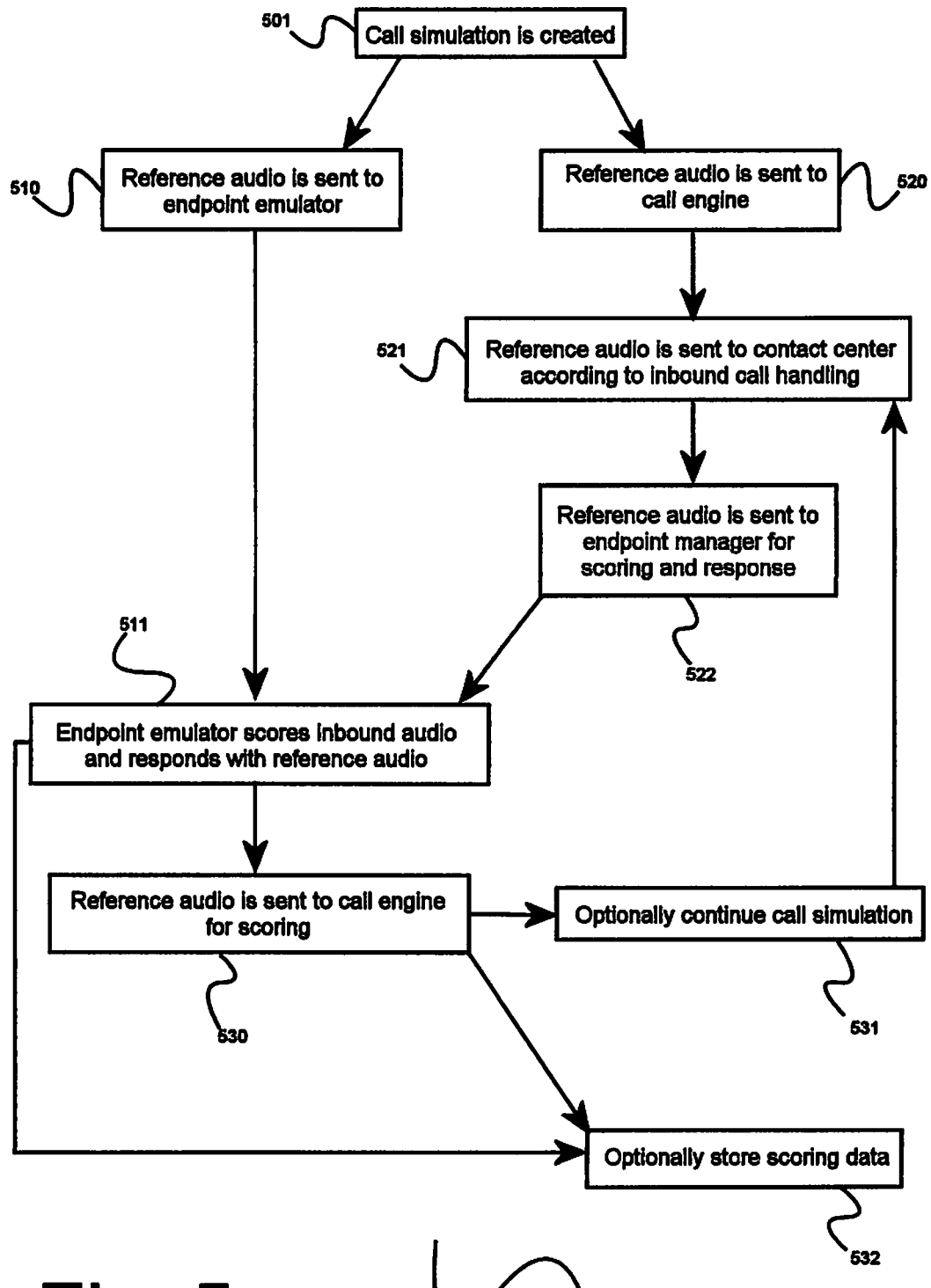
FIG. 5 is a block diagram illustrating a method for automated audio quality testing, according to a preferred embodiment of the invention.

FIG. 5 is a method illustration of a preferred embodiment of the invention, illustrating a general flow for handling automated audio quality testing as may be utilized within a contact center according to a system described above (referring to FIG. 4). As illustrated, in an initial step 501, a call simulation begins. This may be initiated via a web interface (as illustrated previously, referring to FIG. 4) or other means of interaction with a testing system, and may be performed as part of a manual or automated process. In a next step 510, reference audio is sent to an endpoint emulator for use in simulating a contact center agent's responses to inbound interactions form a customer. In a parallel step 520, similar reference audio may be sent to a call engine for use in simulating a customer's inbound interactions with a contact center agent. In a next step 521, reference audio for customer simulation may be sent to a contact center via inbound call handling means, such as over a PSTN or similar telephony network or via an Internet or other data network for VoIP call interactions, and may be processed internally be a contact center according to standard call handling for inbound interactions. In a next step 522, reference audio may be routed within a contact center to an endpoint emulator for simulated agent handling. In a next step 511, an endpoint emulator may score received audio based on quality, and may then respond to incoming reference audio with reference audio received in a previous step 510, simulating an agent's response to a customer interaction. In a further step 530, audio may be sent from an endpoint emulator via outbound handling means back to a call engine, simulating an agent's response being received by a customer. Audio may then be scored by a call engine based on quality, and in a final step 531 a call simulation may optionally continue with exchange of reference audio between a call engine and endpoint emulator, simulating prolonged interactions between a customer and contact center agent. In an optional step 532, scoring data from previous steps 511 and 530 may be stored for future use in a database or similar data storage medium, which may be internal or external to a contact center (such as remote, cloud-hosted storage service on an Internet or other data network). It will be appreciated that steps illustrated are exemplary, and additional steps may be implemented according to the invention and as may be appropriate according to a specific contact center's arrangement, such as inclusion of further steps for additional software or hardware elements not featured in the exemplary system.

Figure 6:
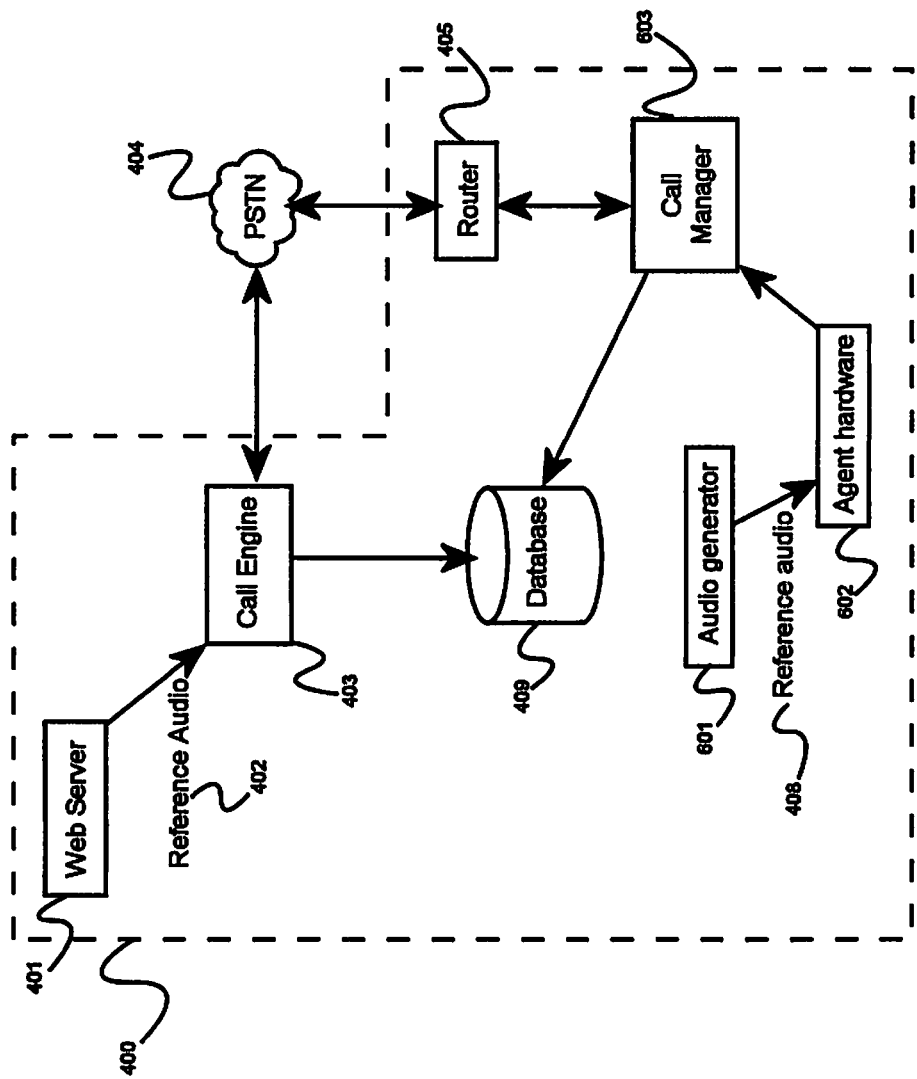
FIG. 6 is a block diagram illustrating a system for automated audio quality testing incorporating audio generator devices, according to an embodiment of the invention.

FIG. 6 is a block diagram of an embodiment of the invention, illustrating a system for automated audio quality testing within a contact center 400. As illustrated and previously described, a web server 401 may send reference audio 402, i.e. audio samples simulating a customer's interactions with a contact center agent, to a call engine 403. According to the embodiment, a plurality of audio generator devices 601 may be implemented to generate reference audio 408 for use in simulating agent responses to inbound audio interactions. Reference audio may be transmitted via agent hardware 602 such as a telephone handset or headset, or via audio software on an agent workstation for use in testing VoIP call interactions. Audio may then be sent through a call manager 603, which may serve the function of handling call interactions and responses between simulated agents and customers. Call engine 403 may initiate a simulated call via a PSTN 404 or similar network (such as, in the case of VoIP calls, an Internet or similar data network), to which may be connected a router 405 within contact center 400. Router 405 may then determine to send a call simulation to a call manager 603, which may use previously received reference audio 408 to simulate a contact center agent's responses to a call. As illustrated, a bidirectional call flow may be established between call engine 403 and call manager 603, facilitating continued call simulation of a prolonged interaction as appropriate. Each time audio is received by a call engine 403 or call manager 603, it may be scored based on its quality and such a score optionally stored in a database 409 or similar data storage medium for later retrieval for review or analysis. In this manner, automated testing of audio quality across a contact center's systems may be facilitated, and such testing results stored for use in any of a variety of further applications, such as (for example) the generation of reports detailing test results or analysis of previous test results to facilitate optimization of future tests or contact center operations. It will be appreciated that the arrangement illustrated is exemplary, and that a variety of additional or alternate elements may be utilized according to the invention, enabling such a system to be flexible in nature and readily adaptable to a variety of contact center architectures.

Figure 7:
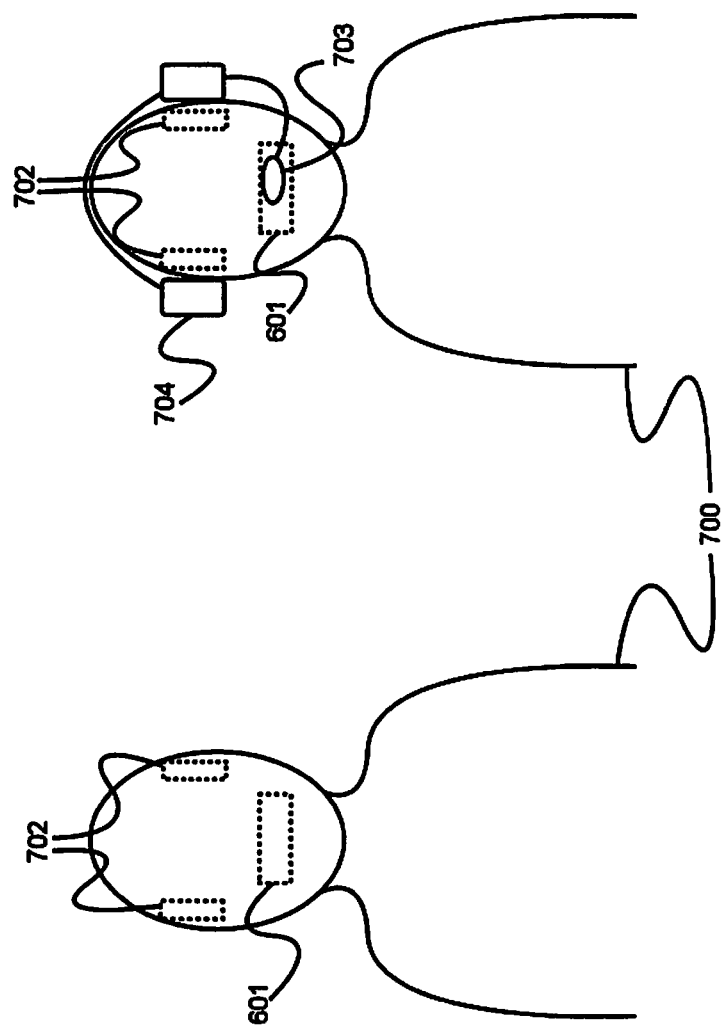
FIG. 7 is an illustration of a HATS device and its use, according to an embodiment of the invention.

FIG. 7 is an illustration of an exemplary HATS device 700 for use in simulating a contact center agent incorporating physical and acoustic properties of a human torso. As illustrated, a HATS device 700 may have the general physical shape and form of a human torso, and may be constructed in such a way and with such materials as to replicate the density or other properties of a human body for acoustic accuracy. As illustrated, HATS device 700 may comprise an integrally fixed or removable affixed audio generator device 601, which may be used to transmit reference audio samples, appropriately simulating an agent speaking with their mouth into a piece of hardware such as a telephony headset microphone 703. HATS device 700 may further comprise a plurality of integral or removable affixed audio receivers 702, which may be designed and positioned in such a way as to simulate a human agent's ears for receiving transmitted audio, such as from a telephony headset's speakers 704. As illustrated, a HATS device 700 may be used in such a fashion as to simulate an agent utilizing their workstation equipment such as (as illustrated) a phone headset or other equipment, so as to more accurately simulate the audio properties of a human agent interacting with their equipment while interacting with a customer. It will be appreciated that such a configuration as illustrated is exemplary in nature, and that alternate or additional agent hardware including (but not limited to) phone headsets, handsets, speakerphone systems, or other equipment may be utilized according to the invention, and a HATS device 700 may be readily adapted for such use.

The skilled person will be aware of a range of possible modifications of the various embodiments described above. Accordingly, the present invention is defined by the claims and their equivalents.

What is claimed is:

1. A system for automated testing of audio quality, comprising:
    a call engine;
    an endpoint manager;
    a first audio generator device; and
    a head and torso simulator device comprising a microphone and a second audio generator device;
    wherein the call engine utilizes reference audio samples to simulate customer interactions with a contact center;
    wherein the first audio generator device transmits reference audio samples via agent hardware to simulate agent interaction with customers;
    wherein the endpoint manager utilizes reference audio samples to simulate contact center agents' interactions with customers;
    wherein the head and torso simulator device simulates the physical and acoustic properties of a human body;
    wherein the second audio generator device transmits audio from the head and torso simulator device to simulate customer interaction with agents; and
    wherein the first audio generator device transmits audio to the head and torso simulator device to simulate agent interaction with customers.

2. A method for automated testing of audio quality, comprising the steps of:
    creating a simulated call over an audio connection;
    transmitting reference audio to endpoint manager and call engine;
    transmitting call engine audio to endpoint manager;
    scoring received reference audio by endpoint manager;
    transmitting endpoint manager audio to call engine;
    scoring received endpoint manager audio by call engine;
    scoring the audio connection quality; and
    storing audio scoring and audio connection quality data in a database or other data storage medium;
    wherein a head and torso simulator device comprising at least a microphone and an audio generator simulates the physical and acoustic properties of a human body and is used to receive the reference audio transmitted by the call engine and to transmit the endpoint manager audio.

* * * * *